Dec. 27, 1966   N. H. HOLLEFRIEND   3,294,384
ROTARY KILN WITH PREHEATER
Filed Dec. 7, 1964

Inventor
Norman H. Hollefriend
By Arthur M. Streich
Attorney

3,294,384
ROTARY KILN WITH PREHEATER
Norman H. Hollefriend, Montreal, Quebec, Canada, assignor to Allis-Chalmers Manufacturing Company, Milwaukee, Wis.
Filed Dec. 7, 1964, Ser. No. 416,433
4 Claims. (Cl. 263—33)

This invention relates to rotary kilns such as are used to produce cement clinker. Such kilns are conventionally supported with the material feed end elevated slightly higher than the discharge end the kiln is driven to rotate about the central axis of the kiln. In particular, the invention relates to such a rotary kiln having an internal material preheater.

In the process of calcining limestone to produce cement clinker alkalies in the raw material, which are unwanted in the final product, are volatilized at temperatures over 2,000° F. and carried in the gas stream. When hot gases from the calcining zone are used to preheat material it is desirable to make maximum use of fuel burned by preheating the material to over 1,000° F. and not discharging gases to a stack until such material preheating has reduced gas temperatures substantially below 1,000° F. However, when such efficient use of available heat is attained by exposing cool material to such gases for preheating the material, the gases then cool and the alkali vapors sublime or condense back to solid particles which tend to be picked up by the preheated material and carried back into the calcining zone. Repeated recycling of alkalies in that manner results in an undesirable amount of alkali in the finished cement clinker.

It is an object of the present invention to provide a new and improved material preheater for a calcining kiln which provides for rapid and efficient use of the heat in gases from a calcining zone for preheating the material but without producing cement containing undesirable amounts of alkalies.

It is another object of the present invention to accelerate the velocity of gases used to preheat the material so that condensed particles of alkalies will be carried by the gas stream through the preheater for disposal as desired.

According to the present invention material is introduced into the feed end of a kiln through a feed delivery pipe aimed to always spill material upon a portion of the kiln interior turning through a low portion of its circular path. Longitudinally extending lifters pick up a load of the material and when rotation of the kiln brings a loaded lifter to the top of its circular path the lifters then dump the material to shower downwardly over a plurality of tubes through which are passed gases from the calcining zone on their way to a stack. The tubes are arranged parallel to each other and parallel to the central axis of the surrounding kiln shell. The tubes are supported at both ends by a tube sheet. The tube sheet nearest the feed end of the kiln is fastened to the tube ends and to the kiln shell. The tube sheet at the opposite ends of the tubes is fastened only to the tubes and therefore is axially movable in the kiln to allow free thermal expansion and contraction of the tubes. Suitable openings are spaced around the periphery of both tube sheets so that material can pass through the sheets only near the periphery. The tubes may be made long enough and baffles may be provided in order that the lifters can shower material over the tubes several times before the material passes through the movable tube sheet toward the calcining zone within the kiln. Thus the preheating gases do not make direct contact with the material being preheated and alkalies do not contact the material. Further, the increased velocity of the gases passing through the tubes causes the gases to blow condensed alkali particles through the tubes for disposal as desired.

Other objects and how they are attained will appear from the following more detailed description of the invention with reference to the drawings in which.

Figure 1:
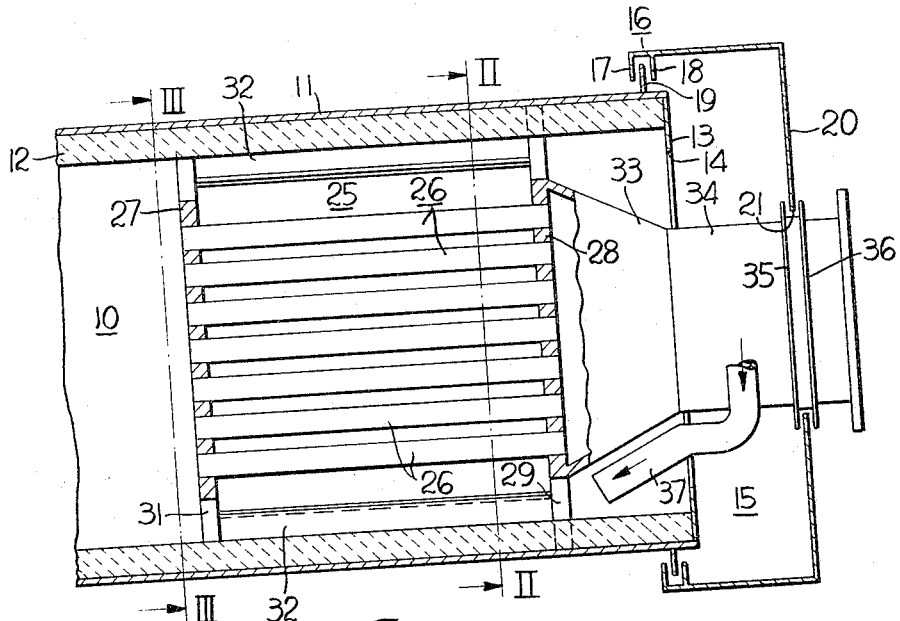
FIG. 1 is a sectional view of the feed end of a rotary kiln according to the present invention.

Referring to the drawings, a rotary kiln 10 is shown which may be supported by any conventional means (not shown) with the material feed end elevated slightly higher than the discharge end and driven to rotate about its central axis in any conventional manner (not shown). The kiln 10 comprises a shell 11 lined with refractory brick 12. An annular ring 13 is fitted to the open feed end of shell 11 to define a circular opening 14 smaller than the opening defined by the brick 12 lining the shell 11. The ring 13 acts as a retaining and protecting ring for brick 12 and also provides a dam to prevent a back flow of material from spilling out of the kiln. A stationary hood 15 supported by conventional means (not shown) encloses the feed end of kiln 10. A labyrinth type seal 16 is provided by a pair of spaced annular rings 17, 18 that project radially inward of a portion of hood 15 that overlaps the end of kiln 10. An annular ring 19 is attached to the outer surface of shell 11 and projects radially outward between rings 17, 18 to provide the gas seal assembly 16. Hood 15 is provided with a back wall 20 defining an opening 21 somewhat smaller than the opening 14 through ring 13.

Figure 3:
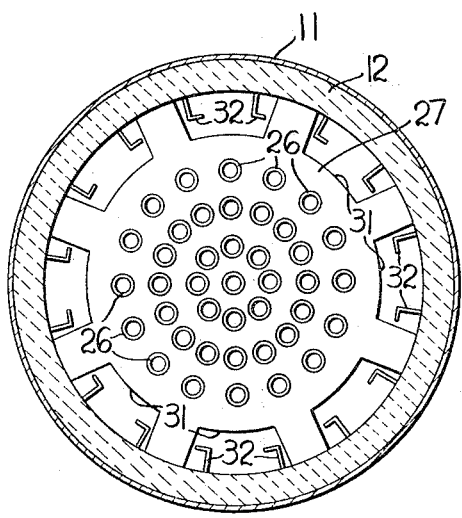
FIG. 3 is a view along line III—III of FIG. 1 taken in the direction indicated by arrows.
Figure 2:
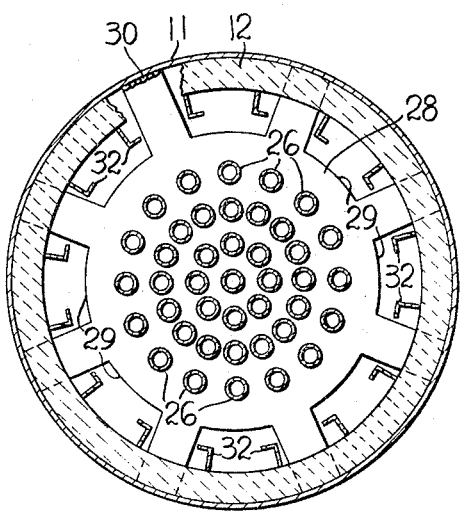
FIG. 2 is a view along line II—II of FIG. 1 taken in the direction indicated by arrows.

A feed preheater assembly 25 is mounted within kiln 10. The assembly 25 includes a plurality of tubes 26 each fastened at their ends to a tube sheet 27 and 28. Tubes 26 are arranged parallel to each other and parallel to the central axis of surrounding kiln shell 11. Tube sheet 28, which is nearest to the feed end of kiln 10, is fastened to the interior of shell 11 in a manner that can be seen in FIG. 2. As shown in FIG. 2, the tube sheet 28 defines a plurality of circumferentially spaced peripheral openings 29. The portions of tube sheet 28 between the openings 29 projects radially outward to the inner surface of shell 11 where welds 30 fastened tube sheet 28 to the shell 11. Tube sheet 27 is nearer to the highest temperature zone within the kiln than is sheet 28 and sheet 27 is fastened only to tubes 26. As shown in FIG. 3, the tube sheet 27 defines a plurality of circumferentially spaced peripheral openings 31. The portions of tube sheet 27 between openings 31 project radially outward only to the inner surface of the lining of bricks 12. Tube sheet 27 is not secured to the kiln shell 11 and therefore tubes 26 can expand and contract freely in response to the temperature changes within the kiln. A plurality of axially extending lifters 32 are spaced around the inner periphery of the kiln between the tube sheets 27, 28.

Associated with hood 15 is a gas collecting funnel 33 having a base of sufficient diameter to enclose all tube openings on the discharge side of tube sheet 28. The funnel 33 is connected at its larger diameter to sheet 28 and at its smallest diameter to a conduit 34 that projects outward through the opening 14 in ring 13 and through opening 21 in backwall 20. A pair of annular rings 35, 36, one on each side of back wall 20, project radially outward of conduit 34. Wall 20 and rings 35, 36 provide a labyrinth type gas seal similar to the seal 16 around the end of kiln shell 11. A feed delivery pipe 37 projects through hood 15 (and is supported by means not shown) and is aimed to deposit feed material within the kiln near tube sheet 28 on a portion of the internal surface passing through the low portion of its circular path.

In the operation of the described apparatus feed material flowing through delivery pipe 37 is deposited within the kiln near tube sheet 28. The rotation of the kiln and its downward incline causes the material to flow through openings 29 in tube sheet 28. The lifters 32 then pick up the material and shower it downwardly over tubes 26. The material may be picked up and showered over the tubes more than once and internal baffling (not shown) may be provided to insure such action. After showering downward over tubes 26 the material will pass through the openings 31 in tube sheet 27 and pass on toward the calcining zone within the kiln 10. High temperature gases (usually about 1800° F.) flowing in the opposite direction will enter tubes 26 at the ends supported by tube sheet 27 and will pass out of tubes 26 into the gas collecting funnel 33 and pass out of the kiln through conduit 34. The length of tubes 26 and the spacing of the tube sheets 27, 28 can be arranged to provide sufficient heat transfer to drop the temperature of the gases from the 1800° F. range to well below 1,000° F. while preheating the material to over 1000° F. Since the gases do not make physical contact with material during this preheating the arrangement can be used to preheat alkali containing cement making material with very low alkali content in the finished product. The alkali material volatilized at the temperatures over 2,000° F. will produce solid particles in the cooling gas stream in tubes 26 but such particles will be blown out with stack gases without having an opportunity to get back into the preheating raw material showering down over tubes 26 and thus the stated objects have been achieved with the disclosed apparatus.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereinafter be, appended hereto.

The embodiments of the invention in which an exclusive property or privilege is claimed are defined as follows:

1. In a rotary kiln supported for rotation about an axis through the center of the kiln and inclined downwardly from the feed end toward the discharge end, a feed material preheater mounted within said kiln adjacent the feed end thereof comprising a pair of axially spaced tube sheets each defining a plurality of circumferentially spaced openings around the inner periphery of said kiln for passing therethrough particles of solid materials being kilned, a plurality of tubes passing through both said tube sheets and fastened thereto in parallel alignment with each other and with the central axis of the kiln, the ends of each of said tubes defining an opening to receive and pass through each tube gases coming from the material discharge end of said kiln, and a plurality of lifters between said tube sheets and mounted on the inner periphery of said kiln projecting radially inward toward said tubes for lifting material within said kiln between said tube sheets and discharging the material over said tubes to shower downwardly over the external surface of said tubes.

2. In a rotary kiln supported for rotation about an axis through the center of the kiln and inclined downwardly from the feed end toward the discharge end, a feed material preheater mounted within said kiln adjacent the feed end thereof comprising a pair of axially spaced tube sheets each defining a plurality of circumferentially spaced openings around the inner periphery of said kiln for passing therethrough particles of solid material being kilned, a plurality of tubes passing through both said tube sheets and fastened thereto in parallel alignment with each other and with the central axis of the kiln, the ends of each of said tubes defining an opening to receive and pass through each tube gases coming from the material discharge end of said kiln, a plurality of lifters between said tube sheets and mounted on the inner periphery of said kiln projecting radially inward toward said tubes for lifting material within said kiln between said tube sheets and discharging the material over said tubes to shower downwardly over the external surface of said tubes, and a gas collecting funnel fastened to the tube sheet nearest the kiln feed end and on the kiln feed end side thereof, said funnel being spaced radially inward of said solid material passing openings but surrounding all of said tube end openings.

3. In a rotary kiln supported for rotation about an axis through the center of the kiln and inclined downwardly from the feed end toward the discharge end, a feed material preheater mounted within said kiln adjacent the feed end thereof comprising a pair of axially spaced tube sheets each defining a plurality of circumferentially spaced openings around the inner periphery of said kiln for passing therethrough particles of solid material being kilned, a plurality of tubes passing through both said tube sheets and fastened thereto in parallel alignment with each other and with the central axis of the kiln, the ends of each of said tubes defining an opening to receive and pass through each tube gases coming from the material discharge end of said kiln, a plurality of lifters between said tube sheets and mounted on the inner periphery of said kiln projecting radially inward toward said tubes for lifting material within said kiln between said tube sheets and discharging the material over said tubes to shower downwardly over the external surface of said tubes, a gas collecting funnel fastened to the tube sheet nearest the kiln feed end and on the kiln feed end side thereof, said funnel being spaced radially inward of said solid material passing openings but surrounding all of said tube end openings, and feed delivery pipe projecting into said kiln beneath said funnel.

4. In a rotary kiln supported for rotation about an axis through the center of the kiln and inclined downwardly from the feed end toward the discharge end, a feed material preheater mounted within said kiln adjacent the feed end thereof comprising a pair of axially spaced tube sheets each defining a plurality of circumferentially spaced openings around the inner periphery of said kiln for passing therethrough particles of solid material being kilned, the tube sheet nearest the feed end of said kiln being fastened to the interior of said kiln and the other being axially movable within said kiln, a plurality of tubes passing through both said tube sheets and fastened thereto in parallel alignment with each other and with the central axis of the kiln, the ends of each of said tubes defining an opening to receive and pass through each tube gases coming from the material discharge end of said kiln, a plurality of lifters between said tube sheets and mounted on the inner periphery of said kiln projecting radially inward toward said tubes for lifting material within said kiln between said tube sheets and discharging the material over said tubes to shower downwardly over the external surface of said tubes, a gas collecting funnel fastened to the tube sheet nearest the kiln feed end and on the kiln feed end side thereof, said funnel being spaced radially inward of said solid material passing openings but surrounding all of said tube end openings, and feed delivery pipe projecting into said kiln beneath said funnel.

References Cited by the Examiner

UNITED STATES PATENTS

| 848,362 | 3/1907 | Geiger | 165—88 |
|---|---|---|---|
| 1,556,230 | 10/1925 | Fisk | 165—88 |
| 3,039,753 | 6/1962 | Eketorp et al. | 263—33 |

FREDERICK L. MATTESON, Jr., *Primary Examiner.*

JOHN J. CAMBY, *Examiner.*